Nov. 24, 1959   G. R. TREVENNA   2,914,319
POLISHING BUFFS AND MACHINES FOR THEIR MANUFACTURE
Filed Oct. 8, 1954   11 Sheets-Sheet 5

Nov. 24, 1959     G. R. TREVENNA     2,914,319
POLISHING BUFFS AND MACHINES FOR THEIR MANUFACTURE
Filed Oct. 8, 1954     11 Sheets-Sheet 6

Nov. 24, 1959     G. R. TREVENNA     2,914,319
POLISHING BUFFS AND MACHINES FOR THEIR MANUFACTURE
Filed Oct. 8, 1954     11 Sheets-Sheet 7

FIG. 26

United States Patent Office 2,914,319
Patented Nov. 24, 1959

2,914,319

POLISHING BUFFS AND MACHINES FOR THEIR MANUFACTURE

George Roy Trevenna, Sydney, New South Wales, Australia

Application October 8, 1954, Serial No. 461,233

13 Claims. (Cl. 270—58)

This invention relates to machines for the manufacture of polishing buffs, and more particularly to machines for assembling buffs consisting of layers of previously cut pieces of material.

A machine for the purpose defined in the preceding paragraph is described in my British patent specification No. 683,753, that machine assembling the buffs from pieces of material which have been arranged in magazines, each layer in each magazine consisting of a plurality of pieces of material arranged in the same relative positions as they will occupy in a finished buff. The main object of the present invention is to provide an improved machine of the same general nature which will require less attention, and will enable buffs to be produced more economically.

A particular object of the present invention is to provide a buff assembling machine in which each buff assembly is automatically ejected when it reaches a predetermined thickness, and the building up of a further assembly is immediately started. Another object of the invention is to provide automatic means for replacing the magazines containing the pieces of material as they are emptied. Further objects of the invention are to provide improved pick-up means for lifting the pieces of material from the magazines, and to facilitate the laying of the pieces of material in a flat condition.

According to one feature of the present invention, in a machine for assembling polishing buffs comprising pick-up means for picking up pieces of material and depositing the said pieces on an assembly table, means are provided for automatically removing each buff from the assembly table when the building up of the buff is completed.

Each buff is preferably assembled on a tray located on the assembly table, means being provided for automatically removing each tray from the assembly table when the building up of the buff is completed, and replacing it with an empty tray.

The cloth pieces are preferably picked up from magazines, automatic means being provided which act in response to the reduction of the stack of pieces of cloth in any compartment of a magazine to a predetermined minimum to move the said magazine away from the pick-up means and to move a fresh magazine into position for the picking up of of cloth pieces therefrom.

Two pick-up heads may be provided, each of which picks up cloth pieces from one of two magazines, the assembly table moving to and fro so as to receive cloth pieces from each pick-up head alternately, tray guides being provided which extend in the direction of the reciprocating movement of the assembly table, and a tray-moving member being provided which reciprocates with the assembly table but in the opposite sense thereto, tray-engaging means on the tray-moving member being actuated at the completion of the building up of a buff on the assembly table to engage the tray on the said table and a tray on the tray guide at one side of said table so that the relative movement of the assembly table and the tray-moving member moves the second tray on to the assembly table and the first tray on to the tray guide at the other side of said assembly table.

Further, according to the invention, in a machine for assembling polishing buffs comprising means for picking up pieces of cloth from a magazine and depositing said pieces on an assembly table the pieces of cloth are adhesively engaged by the pick-up means, and a downward current of air is maintained around the pieces in the magazine to prevent the picking up of two or more superimposed pieces simultaneously.

The invention is hereinafter described with reference to the accompanying drawings, in which:

Figures 6a and 6b are the two halves of a plan view of the assembly table and its guides, showing the relation of the assembly table to the magazine tables;

Figures 7, 8 and 9 are detail views in side elevation illustrating the changing of the trays on the assembly table;

Figure 10 is a cross-section on the line 10—10 of Figure 6a.

The machine shown in the drawings is designed for the assembly of buffs comprising superimposed fragmentary layers of fabric each layer comprising an inner ring and a circumferential ring. The inner rings of alternate layers are one-piece discs, whilst the inner rings of the intermediate layers are formed by four quadrants. The circumferential ring of each layer is made up of a plurality of truncated sectors which abut each other and have radial edges intersecting the buff exis. The abutting edges of all the pieces in any one layer are offset in relation to the edges of the pieces in the adjacent layer.

The outer circumferential edges of the inner rings, and the inner circumferential edges of the outer rings may be profiled to provide interengaging inclined teeth.

By re-arrangement of the magazines and the pick-up heads, the machine may be modified to assemble buffs in which each layer comprises a single ring of truncated sectors of fabric, the ring having an inner boundary of substantial radius. The machine may also be adapted for the assembly of buffs in which each layer consists, or some of the layers consist, of a complete disc or ring of fabric.

Figure 1:
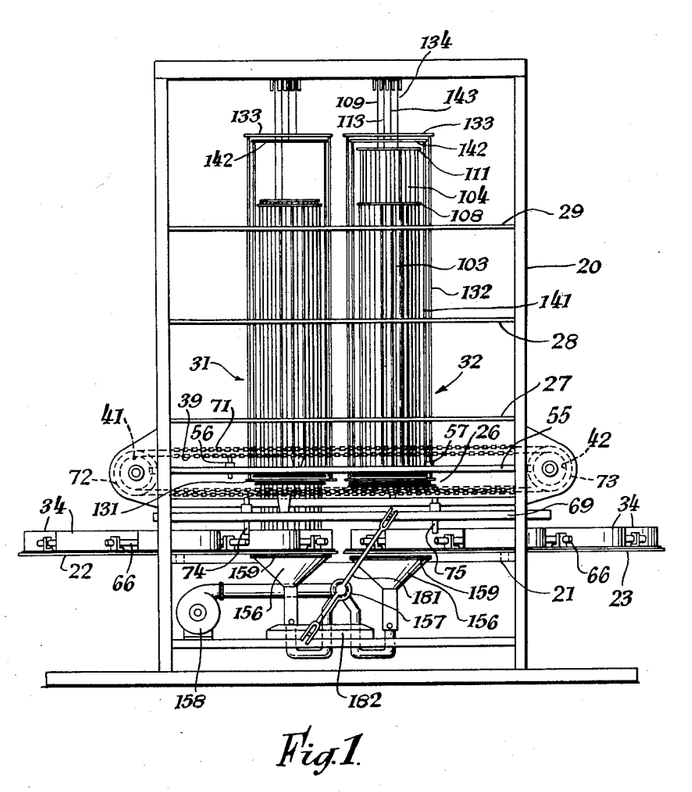
Figure 1 is a front elevation of a buff assembling machine embodying the present invention, some parts having been omitted in the interests of clarity.
Figures 2, 3:
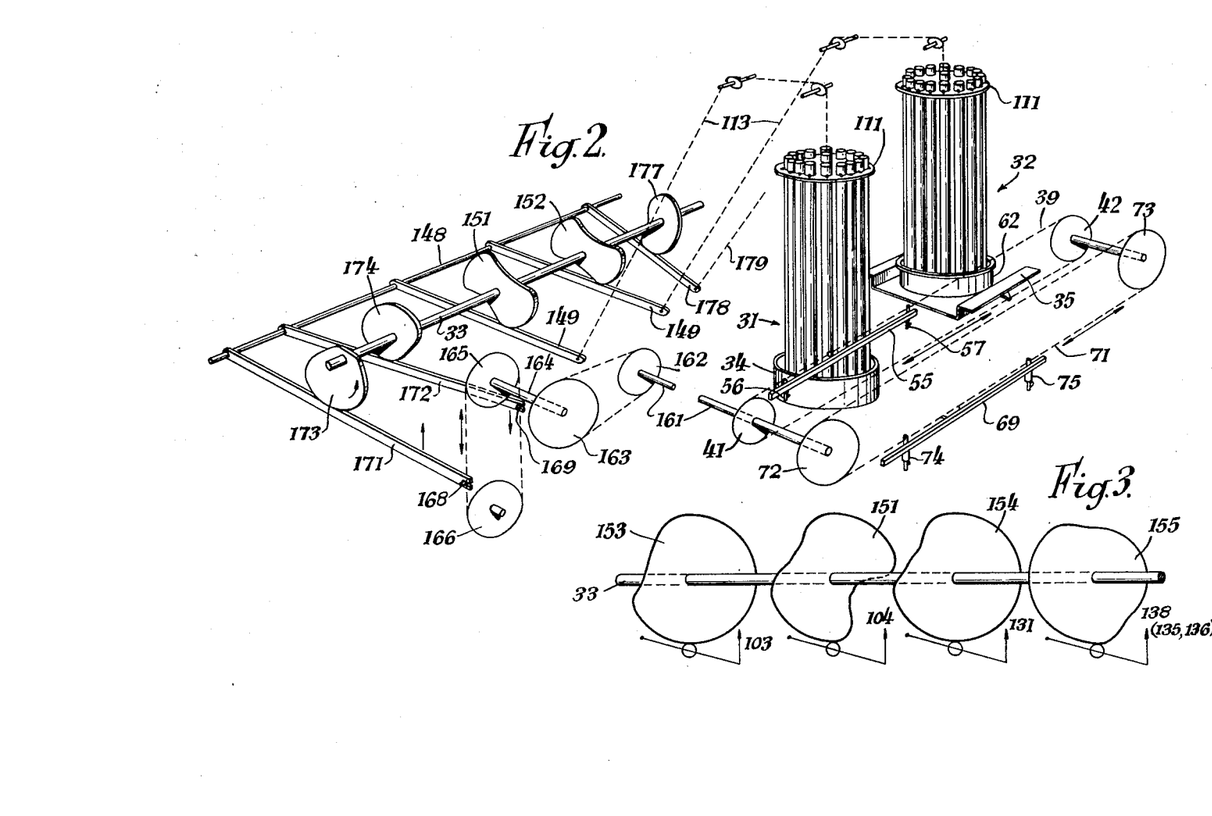
Figure 2 is a diagrammatic perspective view illustrating various features of the driving arrangements.
Figure 3 is an exploded view of the camshaft and a set of cams for operating one pick-up head.

Referring to the drawings, and particularly to Figures 1 and 2, the machine comprises a frame 20, said frame supporting a lower horizontal platform 21 carrying bearings for two circular rotatable magazine tables 22 and 23, spaced horizontal guides 24 and 25 (Fig. 6b) mounted above the tables 22 and 23 and supporting a slidable assembly table 26, and three superimposed upper platforms 27, 28 and 29 apertured to provide guides for the pick-up units of two pick-up heads 31 and 32. The frame also supports a cam-shaft 33 carrying cams effecting the movements of the magazine tables 22 and 23, the assembly table 26, and the pick-up heads 31 and 32, the cam-shaft 33 being rotated by means such as an electric motor (not shown).

The two pick-up heads 31 and 32 are mounted with their vertical axes in a vertical plane containing the axes of the magazine tables 22 and 23, the axes of the pick-up heads being closer together than those of the magazine tables and the axis of the pick-up head 31 being above the magazine table 22 whilst the axis of the pick-up head 32 is above the magazine table 23, both pick-up head axes being spaced from the axes of the magazine tables above which they are located by the same distance. Each magazine table carries a plurality of magazines 34 in circumferential array thereon, the radius of the circle upon which the magazines 34 are located being such that a magazine having its centre on the straight line joining the centres of the magazine tables is co-axial with a pick-up head. The assembly table guides 24 and 25 extend parallel to the line joining the centres of the magazine tables and the assembly table 26, which is slidable in the said guides, is movable between two extreme positions in one of which its centre is aligned with the axis of the pick-up head 31 and in the other of which its centre is aligned with the axis of the pick-up head 32.

The operation of the machine is such that the two pick-up heads 31 and 32 move up and down, both of them moving simultaneously, and the assembly table 26 moves to and fro in such timed relation to the movement of the pick-up heads that at one downward movement of the pick-up heads the assembly table is below the pick-up head 31, at the next downward movement the assembly table is below the pick-up head 32, and at the next downward movement the assembly table is again below the pick-up head 31, so that each pick-up head descends alternately into a magazine to pick up pieces of material therefrom, and on to the assembly table to deposit the pieces of material previously picked up.

The buffs are assembled to trays 35 carried by the assembly table 26, the guides 24 and 25 being extended to support an empty tray ready to replace the one on the assembly table, and to support a tray displaced from the assembly table after the assembly of a buff thereon, and automatic means, operated in response to the building of the buff to a determined thickness, engage the tray 35 on the assembly table 26 and the empty tray 35 simultaneously, displacing the former tray on to the guides and the latter tray on to the assembly table.

Means are also provided as hereinafter described, to engage and turn either of the magazine tables 22 and 23 about its axis to bring a fresh magazine into position below the corresponding pick-up head, in response to emptying of any compartment of a magazine from which pieces of material are being picked up.

Figures 6A, 7, 10:
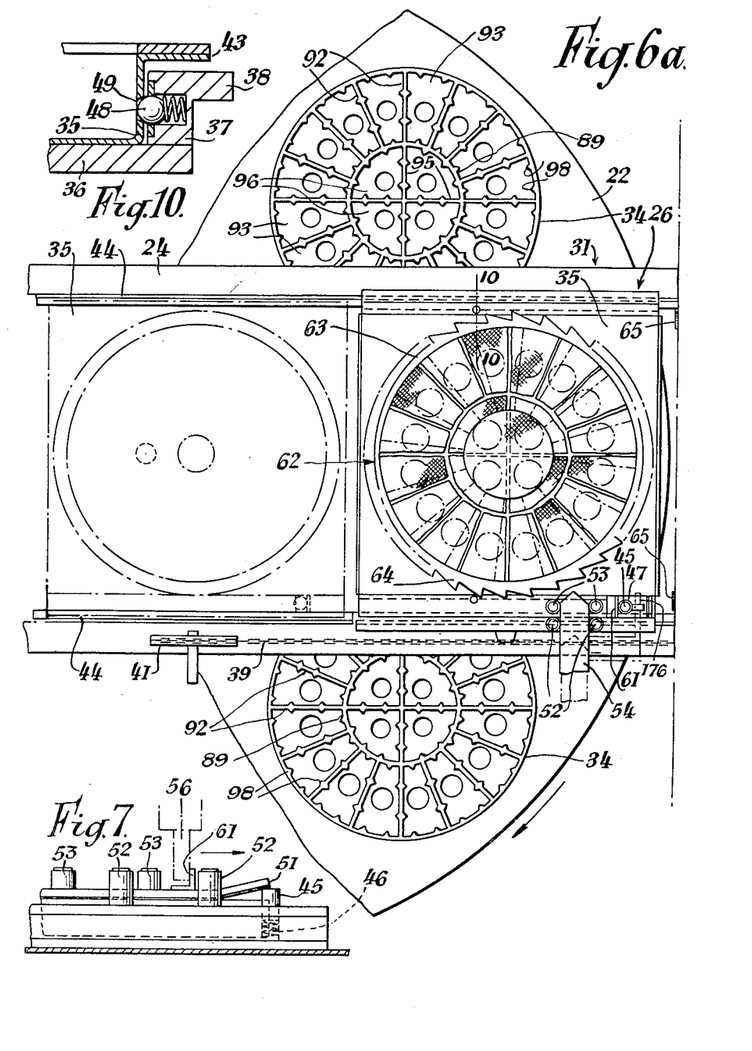

The assembly table 26 comprises a flat base 36 with two upstanding side walls 37 each having an outwardly projecting flange 38 at its upper edge, the table 26 lying between the guides 24 and 25 and the flanges 38 resting on the upper surfaces of the said guides. The assembly table is attached to the lower run of a sprocket chain 39 passing over two sprockets 41 and 42, the table being moved to and fro by movement of the chain 39 first in one direction and then in the other. The trays 35 fit between the side walls 37 of the assembly table and rest on the base thereof. The trays are formed with side flanges 43 which rest, when the said trays are not in position on the assembly table 26, on rails 44 secured to the assembly table guides. The trays are lifted slightly when they move on to the assembly table to lift the side flanges clear of the guides. The assembly table 26 carries, in one of its side walls, a pin 45 urged upwardly by a spring 46, and each tray 35 is apertured at 47 for engagement by the pin 45 to retain the tray in position on the assembly table. Additional location of the trays 35 on the assembly table is provided by spring-loaded balls 48 in the side walls of the assembly table engaging holes 49 in the sides of the trays (Figure 10). The flange 43 on one side of each tray is deflected upwardly at its leading end, as shown at 51 in Figures 7, 8 and 9, so as to act as a ramp to move the pin 45 downwardly as the tray is moved on to the assembly table.

Figures 6B, 8, 9:
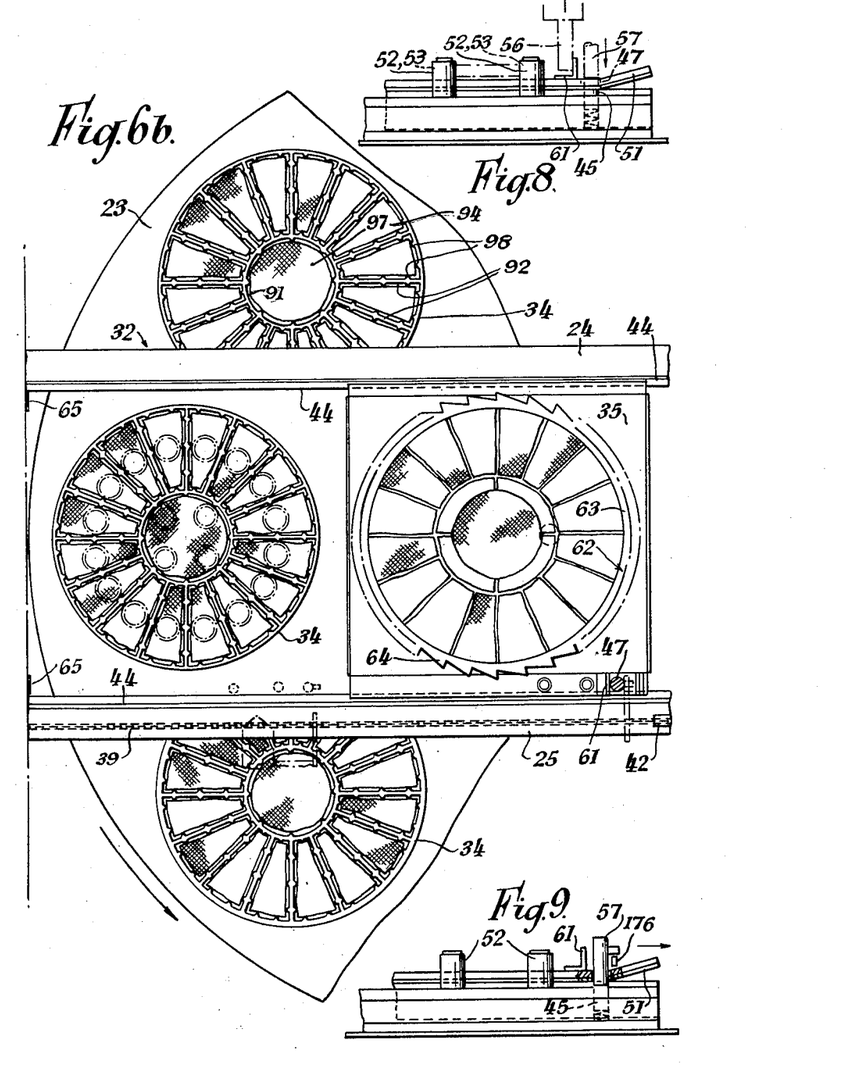
Figures 12, 14, 15:
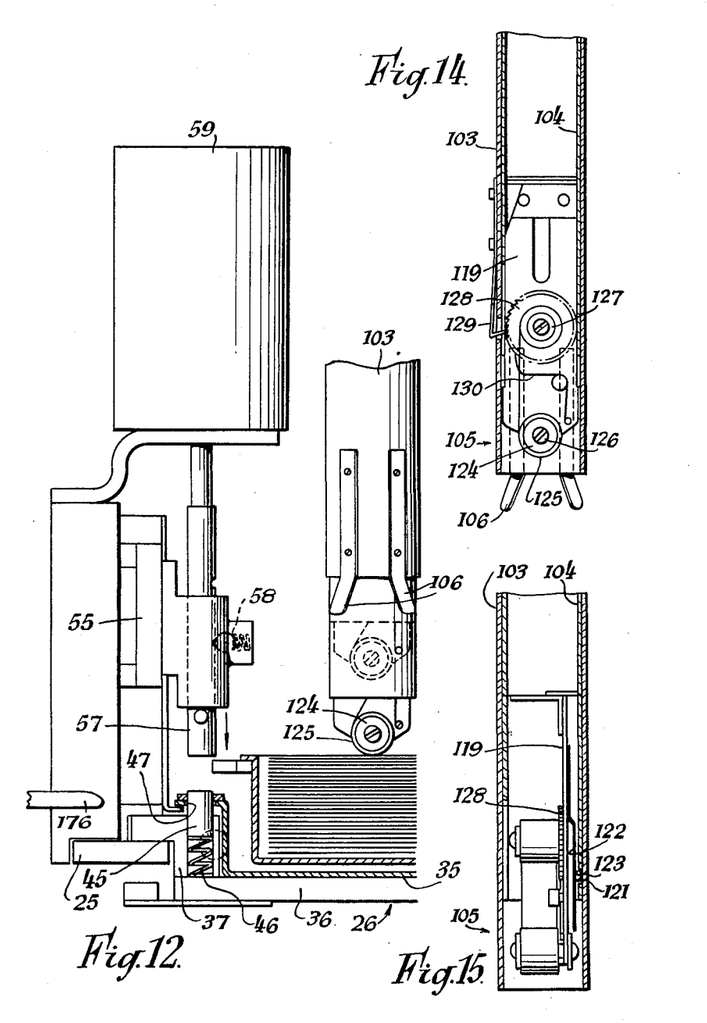
Figure 12 is a partial elevation looking from one end of the assembly table guides and showing the tray-moving mechanism.
Figures 14 and 15 are vertical cross sections, taken in two directions at right angles one to the other, through the lower end of a pick-up unit.

A horizontal bar 55 attached to the upper run of the sprocket chain 39, so as to reciprocate in the opposite sense to the assembly table 26, carries, at spaced points thereon, two vertically movable plungers 56 and 57 normally held in their uppermost positions by spring-loaded ball detents 58 (Figure 12), and adapted to be pushed downwardly when required by solenoids 59 mounted in fixed positions on the machine frame 20. Each tray 35 carries an upstanding lug 61 (Fig. 8).

The tray 35 awaiting movement on to the assembly table 26 lies on the side of the pick-up head 31 remote from the pick-up head 32, and the plungers 56 and 57 are so located on the bar 55 that when the assembly table 26 is below the pick-up head 32 the plunger 56 is just behind the lug 61 on the waiting tray 35, whilst the plunger 57 is aligned with the aperture 47 in the tray on the assembly table. Operation of the solenoids 59 at this instant therefore moves the plunger 56 downwardly to engage the lug 61 on the waiting tray, and moves the plunger 57 downwardly into the aperture 47 in the tray on the assembly table, depressing the pin 45 to free the latter tray. When the assembly table begins to move back towards the pick-up head 31, the two trays are moved in the opposite direction by the bar 55, the tray from the assembly table 26 being moved on to the guides 24, 25 on the side of the pick-up head 32 remote from the pick-up head 31, and the waiting tray being moved on to the assembly table, the latter tray being brought into correct register with the table as described below, so that the pin 45 enters the aperture 47 therein to retain it in position.

Figure 11:
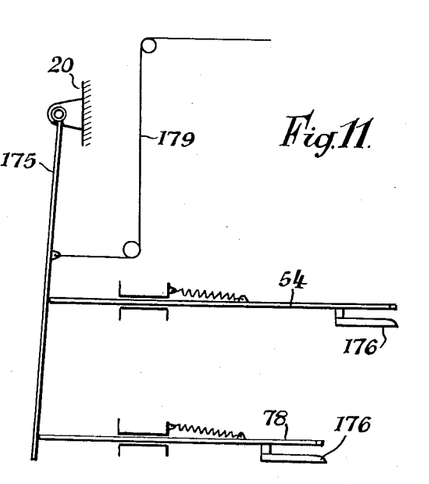
Figure 11 is a diagrammatic view showing the method of operating locating tongues for the assembly and magazine tables.

The assembly table 26 has mounted on it a pair of upstanding rollers 52, and a pair of correspondingly spaced upstanding rollers 53 are mounted on each tray 35. A dependent frame 175 (Figure 11) swinging about a horizontal axis at its upper edge carries two tongues 54 each having a tapered nose, the tongues being so positioned that one of them is opposite the space between the rollers 52 when the assembly tray is under the pick-up head 31, and the other is opposite the said space when the assembly tray is under the pick-up head 32. The frame 175 is given a swinging movement towards and away from the assembly table by means hereinafter described, and is arranged to swing towards the said table each time the said table comes to rest below a pick-up head, one of the tongues passing between the rollers 52 to locate the table accurately below the pick-up head. When a tray has just been moved on to the assembly table, the tongue acts also to locate it accurately thereon by passing between the rollers 53, and thus ensures that the pin 45 enters the aperture 47.

Each tray 35 has rotatably mounted thereon a container 62 having an upstanding peripheral wall 63, and the container 62 is formed externally with ratchet teeth 64 cooperating with pawls 65 mounted on the machine frame to rotate the container through a predetermined angle during each movement of the assembly table 26 from one end to the other of its travel.

Figure 4:
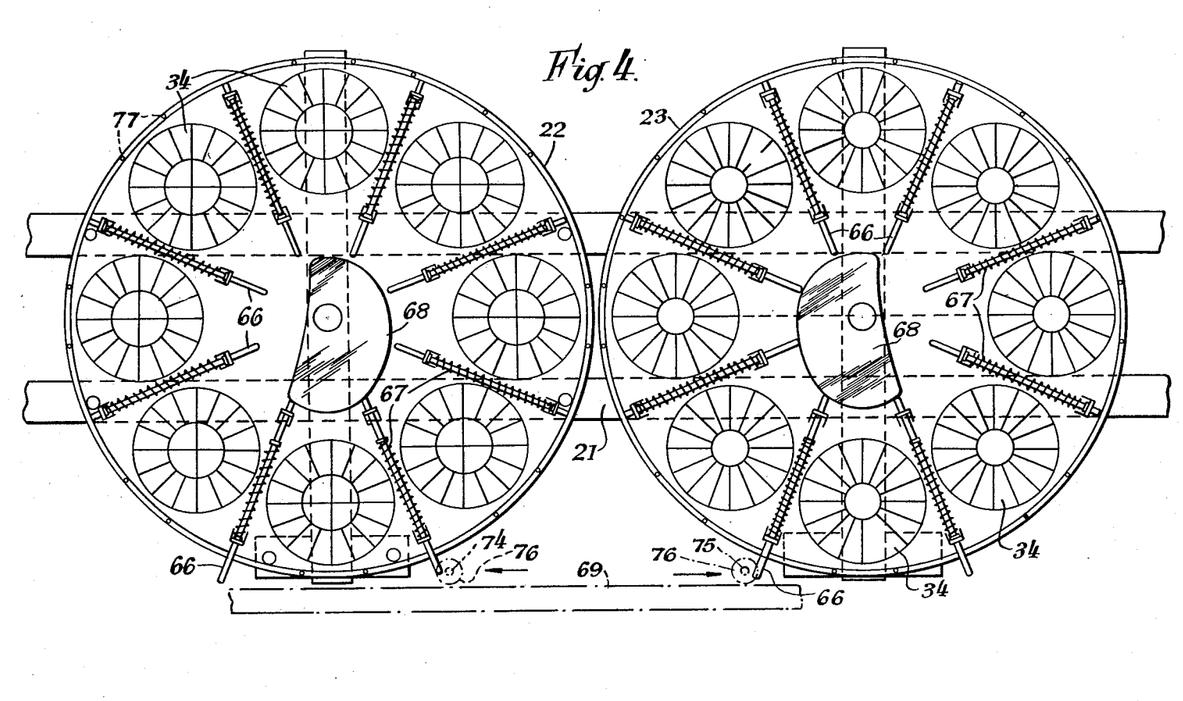
Figure 4 is a plan view of the magazine tables.
Figure 5:
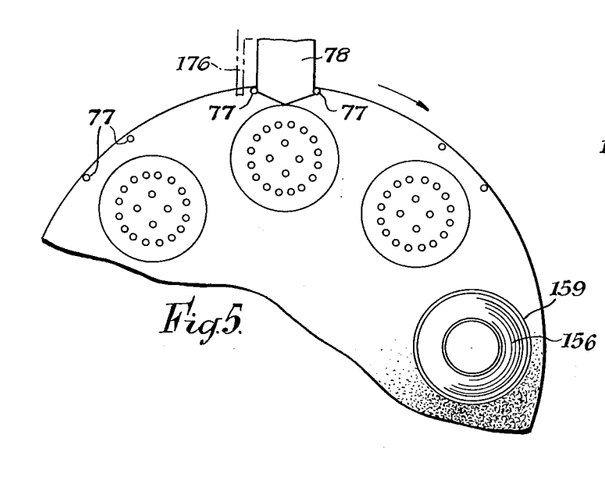
Figure 5 is a partial inverted plan view of one of the magazine tables showing positioning means therefor.

Each magazine table, as shown in Figure 4, accommodates eight magazines 34, and between each two adjacent magazines there is mounted a radially slidable rod 66, urged inwardly by a spring 67. A cam 68, fixedly mounted at the centre of the magazine table moves each rod outwardly as the part of the table on which it is mounted approaches the front of the machine, and allows the said rod to return to its inward position after it has moved through a predetermined angle. A horizontal bar 69, to which continuous to-and-fro movement is transmitted by a sprocket chain 71 passing over sprocket wheels 72 and 73, carries a pair of vertically movable plungers 74, 75 each movable downwardly by a solenoid 76 (Figure 4) to a position in which its horizontal path is obstructed by a projecting rod 66 on one of the magazine tables, so that the next movement of the bar 69 causes angular movement of the corresponding magazine table to bring a fresh magazine into position under the corresponding pick-up head. Each of the plungers 74, 75 is independently operable, the respective solenoids 76 being energised by the closing of contacts associated with the corresponding pick-up head when a compartment in the magazine under that pick-up head is wholly or nearly emptied. Pairs of downwardly projecting rollers 77 are disposed at suitable intervals around the peripheries of the magazine tables 22 and 23, and tongues 78, tapered at their leading ends, are mounted on the frame 175 above described, the said tongues being moved to enter between appropriately positioned pairs of rollers 77 at each inward swing of the frame 175. The tongues 78 thus ensure accurate location of the tables after the latter have been moved. The frame 175 also carries ramps 176 co-operating with the plungers 56, 57 and 75 so that, after these plungers have been moved to their operative positions, and have effected the desired operations, they are returned to their inoperative positions on the next inward swing of the frame 175.

Figures 16, 17, 18:
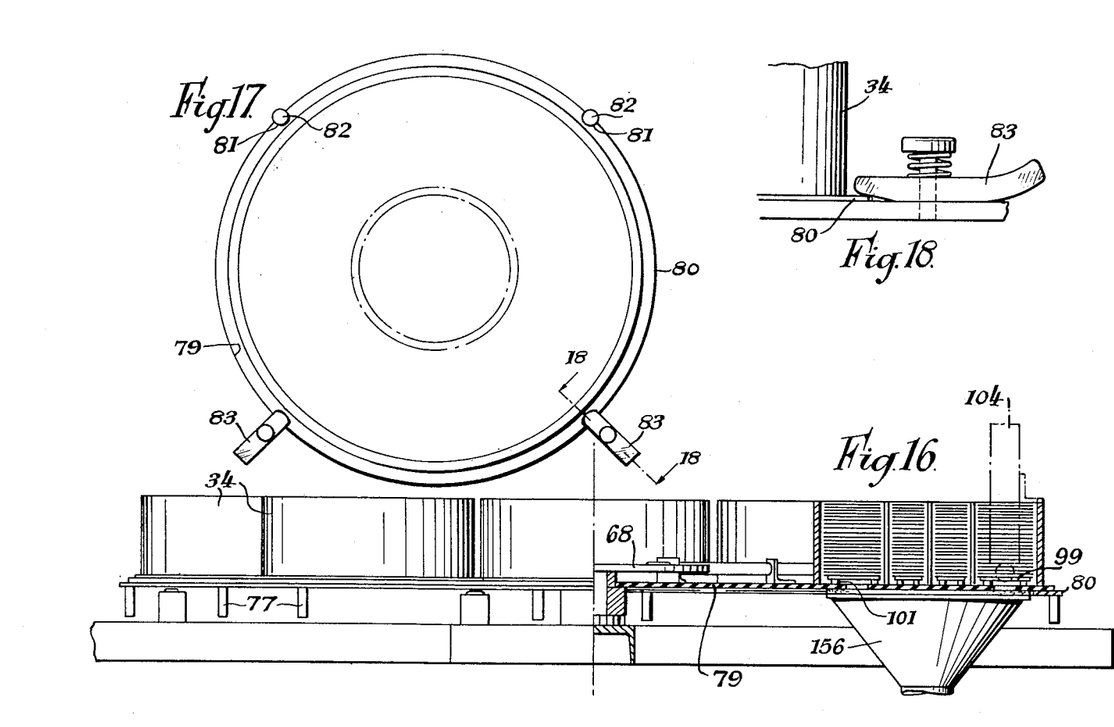
Figure 16 is a side elevation of one of the magazine tables.
Figure 17 is a plan view showing the method of fixing the magazines to a magazine table.
Figure 18 is a section on the line 18—18 of Figure 17 showing details of a catch mechanism.

Each magazine 34 comprises a cylindrical wall mounted on a base plate 79 the outer edge of which forms an external flange 80 at the lower end of the wall. The flange 80 is notched at two points spaced 90° apart, as shown at 81 in Figure 17, to engage two upstanding pins 82 mounted in the magazine table, and is held in position on the said table by two turnbuttons 83 engaging the flange, each turnbutton 83 being located diametrically opposite to one of the pins 82.

Each magazine is divided by a cylindrical partition into inner and outer zones, the cylindrical partitions 89 in the magazines 34 on the table 22 being of greater radius than the cylindrical partitions 91 in the magazines 34 on the table 23. The outer zone of each magazine on both tables is divided by radial partitions 92 into truncated sector-shaped compartments, the compartments between the partitions 92 in the magazines on the table 22 being indicated by the reference 93, and the compartments between the partitions 92 in the magazines on the table 23 being indicated by the reference 94. The inner zones of the magazines on the table 22 are divided by radial partitions 95 into quadrantal compartments 96, whilst the inner zones of the magazines on the table 23 are undivided, and define circular compartments 97. The outer walls of the magazines, and the partitions therein, are formed with vertical ribs 98 of triangular cross-section. A false bottom 99 (Figure 16) is fitted in each compartment of each magazine, the false bottom being located by the ribs 98, and being spaced by those ribs from the walls of the magazine, spacers 101 being provided between the false bottom 99 in each compartment and the base plate 79 of the magazine. The base plate is formed with a hole in the bottom of each compartment, and means, hereinafter described, are provided for creating a downward current of air through the said compartments. Each magazine compartment is filled with previously cut pieces of material having the same shape as that compartment but of slightly smaller size so as to be accurately located in the compartment by the ribs 98.

Figure 13:
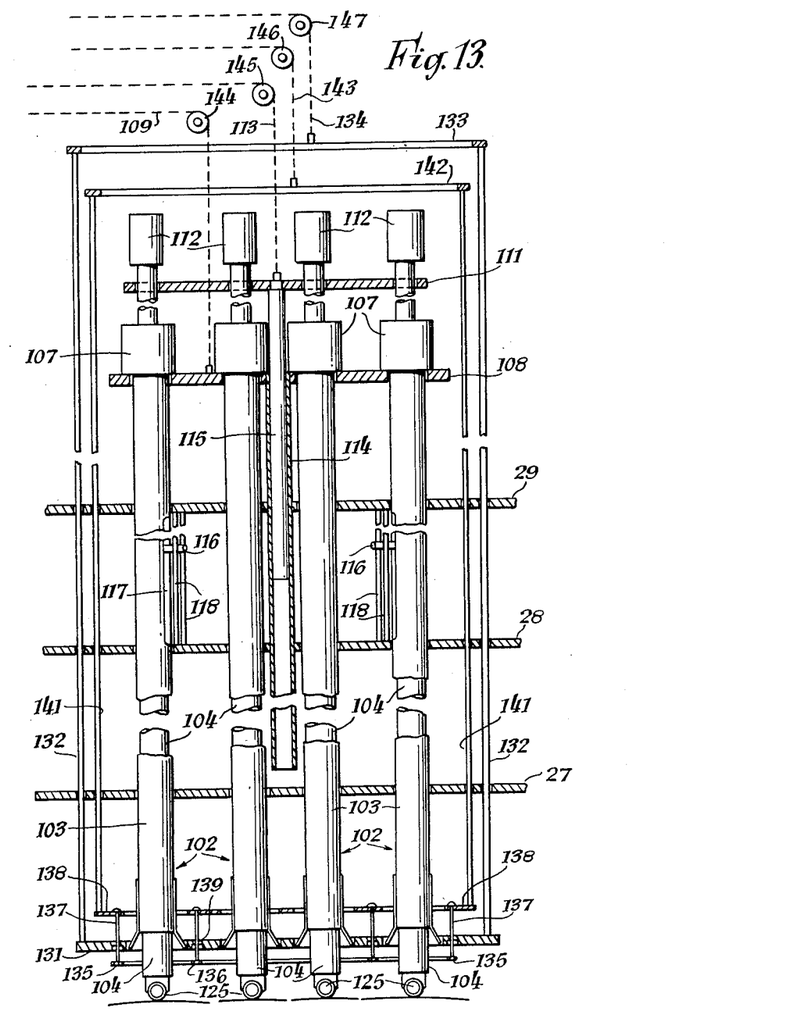
Figure 13 is a transverse section through one of the pick-up heads, only the four pick-up units in the plane of the section being shown.

Referring now to the pick-up heads 31 and 32, one of which is shown in cross-section in Figure 13, each of these comprises a plurality of separate pick-up units 102. Each head 31 or 32 includes an outer ring of units 102, one corresponding to each compartment 93 or 94 of a magazine, and an inner ring of four units 102 which, in the case of the pick-up head 31, correspond each to one compartment 96 of the associated magazines and, in the case of the pick-up head 32, all correspond to the compartment 97.

The pick-up head 32 may be provided with only two units 102 in its inner ring. Each pick-up unit comprises an outer vertical tube 103 slidably guided in the platforms, 27, 28 and 29, an inner tube 104 slidably guided in the corresponding outer tube 103, pick-up means 105 mounted in the lower ends of the inner tubes 104, and resilient fingers 106 mounted on the lower ends of the outer tubes 103. The upper ends of the outer tubes 103 are each provided with enlarged heads 107, and a plate 108, slidable on the tubes 103, is adapted to engage the undersides of the heads 107 to lift the tubes 103 when the said plate is pulled upwardly by a tension member 109.

A second plate 111, arranged above the plate 108, is adapted to engage similar heads 112 on the inner tubes 104, and to lift them independently of the tubes 103 when it is raised by a tension member 113. The plate 108 is guided by a tube 114 fixed to the said plate and extending downwardly through the platforms 29 and 28, and the plate 111 is guided by a rod 115 extending downwardly into the tube 114. Relative rotation of each inner tube 104 with respect to the surrounding outer tube 103, and rotation of each outer tube in the machine frame, are prevented by a pin 116 projecting radially from the inner tube through a longitudinal slot 117 in the outer tube and engaging between a pair of vertical rods 118 extending between the platforms 29 and 28, the said pins and rods being shown in Figure 13 only in association with the pick-up units of the outer ring, although corresponding parts are provided in association with all of the pick-up units.

The pick-up means mounted at the lower end of each tube 104 is carried by a vertical plate 119 engaging slots in the wall of the tube, and releasably held in position by a pin 121 on a leaf spring 122 fixed to the plate 119, the pin 121 engaging in a hole 123 in the tube 104. The pick-up device consists of a reel 124 carrying adhesive tape 125, wound with its adhesive surface facing outwardly, the reel 124 being rotatably mounted on a pin 126 fixed to the lower end of the plate 119, and the tape 125 being led off the reel 124 on to a receiving reel 127 mounted higher up on the plate 119 and formed as one with a ratchet wheel 128. A spring pawl 129 mounted externally on the outer tube 103 projects through holes in the tubes 103 and 104 into the path of the edge of the ratchet wheel 128 and engages with the teeth thereof to move the receiving reel through a small angle at each relative vertical movement of the two tubes. A holding pawl 130 is provided to prevent backward rotation of the receiving reel 127.

Each pick-up head has associated with it a flattening plate 131 apertured for the passage of the pick-up units therethrough, the flattening plate 131 being carried by a plurality of vertical rods 132 extending upwardly through holes in the platforms 27, 28 and 29, the rods 132 being secured at their upper ends to a spider 133 to which is secured one end of a tension member 134 acting to lift the flattening plate 131 independently of the pick-up units.

Two rings 135 and 136, one extending around the outside of the outer ring of pick-up units, and the other extending around the inside of the said ring, are supported by rods 137 from a plate 138 mounted above the flattening plate 131, the rods 137 passing through openings 139 in the flattening plate, and the said plate 131 being recessed on its underside to receive the rings 135 and 136. The plate 138 is in turn carried by rods 141 secured at their upper ends to a spider 142 adapted to be lifted upwardly by a tension member 143 secured thereto.

Each of the tension members 109, 113, 134 and 143 passes over a pulley, the respective pulleys being shown at 144, 145, 146, and 147 in Figure 13, and over another pulley to an arm mounted for oscillating movement about a shaft 148 journalled in the machine frame, each arm being rocked downwardly about the shaft 148 by a cam on the cam-shaft 33, and moved upwardly when allowed to do so by the cam, by the weight of the part of the pick-up head to which it is attached. Figure 2 shows only the tension members 113 connected to the plates 111 of the two pick-up heads, and shows arms 149, 149 to which the tension members are connected. The arms 149, 149 associated with the pick-up heads 31 and 32 respectively are operated by cams 151 and 152 which are identical in shape but are 180° out of phase one with the other. The arms connected to the tension members 109, 134 and 143 are similarly operated by cams having different profiles to give different movements of the arms, the set of cams for operating one pick-up head being shown in Figure 3, where the cam for operating the outer tubes 103 is shown at 153, the cam for operating the flattening plate 131 at 154, and the cam for operating the rings 135 and 136 at 155.

The cams 151, 152, 153 and 154 are so shaped that the parts controlled thereby reach their lowermost positions before the corresponding arms reach the lowest points on the cams, so that accurate cam profiles are unnecessary, and the parts are urged downwardly by their full weight when in their operative positions.

A funnel 156 (Figure 1) is mounted underneath each magazine table so as to be directly below the magazine thereon which is aligned with a pick-up head, and the two funnels are connected by pipes to a change-over valve 157 which is in turn connected to a suction fan 158 driven by a suitable electric motor. The valve 157 is operated in timed relation to the assembly table by an arm 181 forked to engage a pin on the bar 69, so that suction is applied to each funnel in turn when the assembly table is positioned over the other funnel, the funnels being movable through a small distance vertically and each of them being urged upwardly against the underside of the assembly table only when suction is being applied thereto. The funnels are lifted by a cam slide 182 operated by the arm 181. Each funnel 156 is provided with a resilient washer 159 around its upper edge to make a substantially airtight joint with the underside of the assembly table.

The chain sprockets 41 and 72 are mounted on a common shaft 161 carrying also a third sprocket 162 connected by a chain to a sprocket 163 on a shaft 164, the sprocket 163 having twice the number of teeth as the sprocket 162. Another sprocket 165 on the shaft 164 is located vertically above a further sprocket 166, and a chain 167 running round the sprockets 165 and 166 being coupled at 168 and 169 respectively, to two arms 171 and 172 on the shaft 148, the arms 171 and 172 being urged downwardly alternately each by one of two identical cams 173 and 174 on the cam-shaft 33, the cams 173 and 174 being 180° out of phase with each other. The chains 39 and 71 are thus both given a to-and-fro motion in timed relation to the up-and-down movements of the pick-up heads 31 and 32. The sprockets 72 and 73 are of larger diameter than the sprockets 41 and 42, so that the bar 69 has a longer stroke than the bar 39.

The cams 173 and 174 are formed with dwell portions so that the assembly table is stationary for a period of time under each pick-up head. The cam-shaft 33 also carries a cam 177 (Figure 1) operating an arm 178 connected by a tension member 179 to the frame 175 to move the said frame inwardly at the appropriate times.

Figure 19:
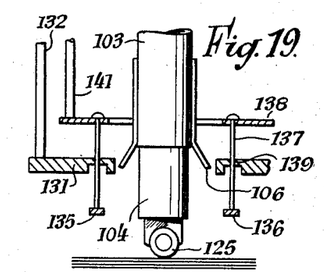
Figures 19 to 25 are diagrams showing the operation of the pick-up units during the picking up and depositing of the pieces of material and Fig. 26 shows diagrammatically an electric circuit for the table moving mechanism.
Figure 20:
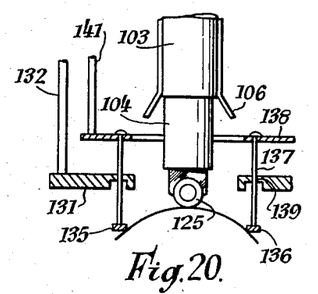
Figures 21, 22, 23, 24, 25:
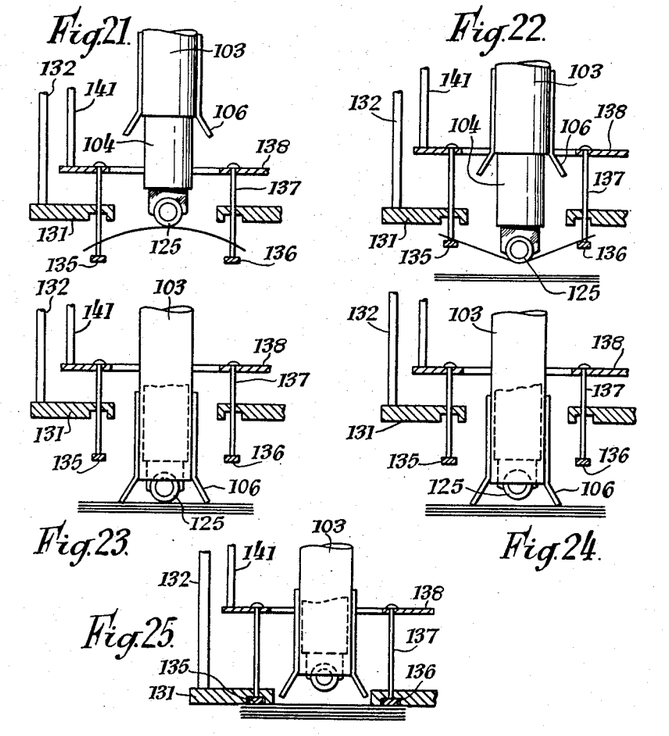

The machine according to the invention operates in the following manner. Let is be assumed that there is a full magazine 34 underneath each pick-up head, and an empty tray 35 on the assembly table 26, and that the assembly table has just moved to the position in which it is below the pick-up head 32. Considering the operation of the pick-up head 31, the pick-up units of that head move downwardly, with the pick-up means 105 in advance of the fingers 106, until the tape 125 on the reels 124 rests on the pieces of material in the several compartments of the magazine 34 below the pick-up head 31, and a piece of material in each compartment is caused to adhere to the appropriate pick-up head, as shown in Figure 19. The tubes 103 and 104 of the pick-up units then rise together, lifting the pieces of material, the downward current of air through the magazine compartments preventing more than one piece of cloth from being lifted by each pick-up unit. The pieces of material tend to sag at their ends, as shown in Figure 20, and the upward movement of the tubes 103 and 104 of the pick-up units forming the outer series draws the pieces of cloth on those pick-up heads between the rings 135 and 136 until they spring outwardly above the rings as shown in Figure 21. When the tubes 103 and 104 have reached their uppermost positions, the assembly table moves to a position under the pick-up head 31, and the tubes 103 and 104 begin to move downwardly, whilst the rings 135 and 136 move upwardly to the position shown in Figure 22. In that figure, the reel 124 is just approaching the surface of the container 62, and the ends of the piece of material are about to ride off the rings 135 and 136, the said ends finally riding off the said rings just as the reel 124 presses the centre of the piece of material against the container 62, so that the said piece lies flat in the container and is not buckled or ridged due to its ends engaging first with the cloth already in the container. The tube 103 then moves downwardly relative to the tube 104 until the fingers 106 press on the piece of material, as shown in Figure 23, after which the tube 104 rises independently of the tube 103, the fingers holding the piece of material down, as shown in Figure 24, whilst the tape 125 is pulled away from it. The tube 103 then begins to rise, and the flattening plate 131 moves downwardly on to the pieces of material deposited, to flatten them. The rings 135 and 136 move downwardly with the flattening plate 131 and are accommodated in the recesses in the underside thereof, so that the said plate presses evenly over the whole area of the layer.

During the depositing of the pieces of material picked up by the pick-up head 31, the pick-up head 32 has been picking up pieces from a magazine on the magazine table 23, and, after the pieces picked up by the head 31 have been deposited, the assembly table returns to its position below the pick-up head 32 to receive a layer of pieces therefrom. During the travel of the assembly table from one position to the other in either direction, the container therein is rotated through a small angle by one or other of the pawls 65, so that the radial lines of meeting of the pieces of material in successive layers are displaced around the buff, and those lines in two adjacent layers never coincide. Because of the different radii of the inner zones in the two magazines, adjacent layers of pieces of material have the lines of meeting between their outer and inner zones displaced relative one to the other.

The building of the buff continues until, when a predetermined thickness has been reached, contacts are closed in the electric circuit of the electro-magnets 59. Additional contacts in series with those closed by the thickness-sensitive means are closed to complete the circuit when the assembly table next reaches its position below the pick-up head 32, and the plungers 56 and 57 are thus moved downwardly so that during the next movement of the assembly table to its position below the pick-up head 31 the tray 35 on the assembly table is removed and a fresh tray 35 is moved into position thereon, in the manner above described.

Figure 26:
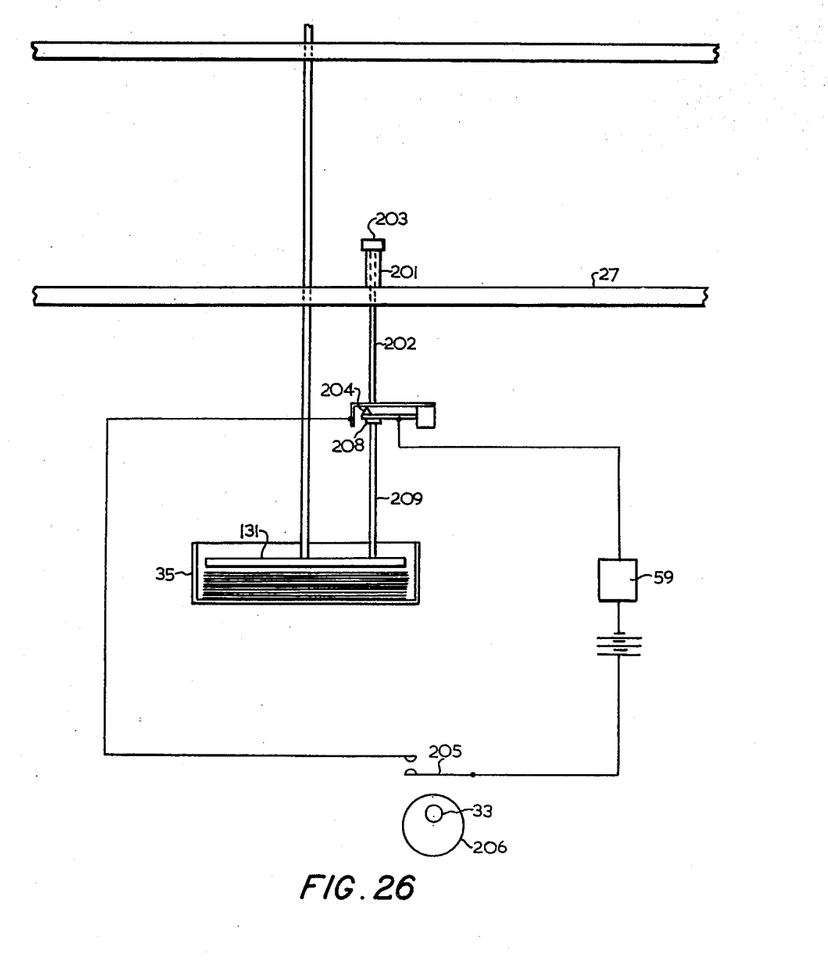

Means for achieving this are illustrated diagrammatically in Fig. 26. Parts 27, 33, 35 and 59 have the same meaning as before.

The flattening plate 131 carries a rod 209 headed at 208. As 209 rises with the flattening plate, the head 208 engages and closes the switch 204. The latter carries a rod 202 headed at 203 which passes through a sleeve 201 fixed on 27. The rod 202 rises with the rod 209 and the switch 204.

On downward movement of 131, the rod 202 moves down until its cap contacts the sleeve 201. The rod 209 moves down further away from the switch 204 which opens.

At a later stage of the cycle when the plate 131 is ready to move upwards again a cam 206 rotating with the shaft 33 closes a second switch 205 in the circuit. Normally the switches 204, 205 are not closed at the same time so that the circuit to the electromagnet 59 is not energized.

As the buff is built up on the tray the downward movement of 209 decreases until, when the buff is of a predetermined thickness, the rod 209 does not move downwards sufficiently to open the switch 204. A little later the cam 206 closes the switch 205 and the circuit is energized to remove the tray with the complete buff and replace it.

When any compartment in the magazine located below one or other of the pick-up heads becomes empty or nearly empty, the downward movement of the corresponding pick-up unit closes contacts in the electric circuit of the solenoid 76 operating the appropriate plunger 74 or 75 on the bar 69, and additional contacts in the said circuit are closed to complete the circuit when the bar 69 reaches one end of its movement, so that on its subsequent movement it turns the magazine table through an angle sufficient to bring another magazine into position below the pick-up head, in the manner previously described.

An analagous circuit to that of Fig. 9 is used for magazine changing.

The trays 35 may be brought up to the position in which they await transfer to the assembly table 26 either manually or by any suitable form of conveyor, and the trays on which buffs have been assembled may be removed either manually or by a conveyor for transfer to a sewing machine by which the cloth pieces are stitched together.

The empty magazines may be refilled in situ on the magazine tables, or may be removed and replaced by full ones, the empty magazines being refilled by hand or by a machine which cuts the cloth pieces in stacks and delivers the cut stacks directly into the appropriate magazine compartments.

The buffs, instead of being built up on trays, may be built up on the assembly table itself, a disc of fairly stiff fabric being preferably placed on the assembly table to form a foundation for each buff, and the disc, with the buff assembled on it, being pushed off the table automatically when the assembly has been completed. The table preferably includes a rotatable portion to receive the discs, so that the latter may be turned progressively as the buff is assembled.

What I claim is:

1. A machine for assembling polishing buffs comprising a buff assembly table, a tray on the table, pick-up means for picking up pieces of material and depositing them on the tray, and means for automatically removing each tray from the assembly table when the building up of the buff is completed and replacing it with an empty tray, wherein two pick-up heads are provided each of which picks up cloth pieces from one of two magazines, and the assembly table moves to and fro so as to receive cloth pieces from each pick-up head alternately, tray guides being provided which extend in the direction of the reciprocating movement of the assembly table, and a tray-moving member being provided which reciprocates with the assembly table but in the opposite sense thereto, tray-engaging means on the tray-moving member being actuated at the completion of the building up of a buff on the assembly table to engage the tray on the said table and a tray on the tray guide at one side of said table so that the relative movement of the assembly table and the tray-moving member moves the second tray on to the assembly table and the first tray on to the tray guide at the other side of said assembly table.

2. A machine for assembling polishing buffs comprising a buff assembly table, a tray on the table, pick-up means for picking up pieces of material and depositing them on the tray, and means for automatically removing each tray from the assembly table when the building up of the buff is completed and replacing it with an empty tray, wherein the cloth pieces are picked up from magazines and automatic means are provided which act in response to the reduction of the stack of pieces of cloth in any compartment of a magazine to a predetermined minimum to move the said magazine away from the pick-up means and to move a fresh magazine into position for the picking up of cloth pieces therefrom.

3. A machine for assembling polishing buffs according to claim 2, wherein the magazines are supported on tables mounted for rotation, and the movement of the magazine is effected by rotation of the said tables.

4. A machine for assembling polishing buffs according to claim 3, wherein two pick-up heads are provided, one of which picks up cloth pieces from a magazine on one rotary table and the other of which picks up cloth pieces from a magazine on another rotary table, the assembly table being reciprocable between positions underneath the two pick-up heads to receive pieces from each of them alternately, and a member reciprocating with the pick-up head carrying table turning members adapted to be moved, by means operated in response to emptying of any compartment of a magazine from which pieces are being picked up, into operative relation with the table carrying that magazine, to effect turning movement of said table and thereby bring a new magazine into position below the corresponding pick-up head.

5. A machine for assembling polishing buffs according to claim 4, wherein projections on the rotary tables are radially movable thereon and are moved outwardly to co-operate with the table-turning members during only a part of each rotation of the tables.

6. A machine for assembling polishing buffs according to claim 1, wherein the assembly table and the tray moving member are coupled one to each run of a sprocket chain extending between two horizontally spaced sprocket wheels.

7. A machine for assembling polishing buffs according to claim 1, wherein the assembly table carries a spring-loaded member engaging a tray thereon to locate the tray in position on the assembly table, and said spring-loaded member is moved to an inoperative position by the tray-engaging means.

8. A machine for assembling polishing buffs according to claim 1, wherein each tray has rotatably mounted thereon a circular container having an upstanding peripheral wall, the said container being provided with ratchet teeth co-operating with pawls mounted in fixed positions in the machine to rotate the said container through a predetermined angle during each movement of the assembly table in either direction.

9. A machine for assembling polishing buffs according to claim 1, wherein each pick-up head comprises a plurality of pick-up units each consisting of separately movable inner and outer members mounted for vertical sliding movement, means providing an adhesive surface at lower end of the inner member, and a plurality of resilient fingers at the lower end of the outer member, means being provided for effecting up and down movement of said inner and outer members in a predetermined relation to the movements of the assembly table, and adhesive surface on the inner member remaining below the fingers on the outer member when the pick-up unit descends to pick up cloth from a magazine, and the said fingers continuing to move downwardly after the piece of cloth attached to the adhesive surface has come to rest on the assembly table and resting on the said cloth during the initial part of the subsequent upward movement of the inner member.

10. A machine for assembling polishing buffs according to claim 9, wherein each pick-up head includes a plurality of pick-up units arranged in one or more circumferential series, and a flattening plate, apertured for the passage of the outer members of said units, is operable to press downwardly on the stack of cloth pieces of the assembly table after each depositing operation of said pick-up head.

11. A machine for assembling polishing buffs according to claim 10, wherein two vertically movable rings are provided below the flattening plate, one inside and one outside a circumferential series of pick-up units, the said rings being movable relative to the pick-up heads in such a manner that they move downwardly as the pick-up heads move upwardly with cloth pieces attached thereto and upwardly as the pick-up heads move downwardly to deposit the cloth pieces, the said cloth pieces moving upwardly past the said rings during the upward movement of the pick-up units and being supported thereon at points spaced from the points at which the pick-up units engage the said pieces until the said pieces are deposited on the assembly table.

12. A machine for assembling polishing buffs according to claim 11, wherein each pick-up head is controlled by four cams each acting on a lever, the lever associated with one cam being coupled by a tension member to the inner members of the pick-up units, the lever associated with another cam being coupled by a tension member to the outer members of the pick-up units and the levers associated with the remaining cams being coupled respectively by tension members to the flattening plate and the rings, the arrangement being such that the cams move the levers in a direction to effect upward movement of the operated parts, the said parts being moved downwardly wholly or mainly by gravity.

13. A machine for assembling polishing buffs according to claim 12, wherein the four cams are mounted on a common driving shaft which carries in addition two further cams acting on levers coupled together by a sprocket chain which is moved to and fro by the said levers, the said sprocket chain passing over a sprocket wheel which is thus rotated alternately in opposite directions, the motion of said sprocket wheel being transmitted to one of two additional sprocket wheels carrying a sprocket chain loop to which the assembly table is connected.

References Cited in the file of this patent
UNITED STATES PATENTS

| | | |
|---|---|---|
| 614,772 | Siegel | Nov. 22, 1898 |
| 1,726,010 | Young | Aug. 27, 1929 |
| 2,260,540 | Schramm | Oct. 28, 1941 |
| 2,509,467 | Anderson | May 30, 1950 |
| 2,764,408 | Weiler | Sept. 25, 1956 |